United States Patent [19]

Feldman

[11] 4,220,754

[45] Sep. 2, 1980

[54] PROCESS FOR THE PURIFICATION OF POLYVINYL CHLORIDE WITH OXIDIZING AGENTS

[75] Inventor: Martin L. Feldman, East Brunswick, N.J.

[73] Assignee: Tenneco Chemicals, Inc., Saddle Brook, N.J.

[21] Appl. No.: 690,202

[22] Filed: May 25, 1976

[51] Int. Cl.² .......................... C08F 6/24; C08F 6/14; C08F 8/06
[52] U.S. Cl. ........................................ 528/483; 8/101; 525/337; 525/368; 525/387; 525/388; 528/480; 528/488; 528/489
[58] Field of Search ................ 528/483, 488, 489, 480

[56] References Cited

U.S. PATENT DOCUMENTS

| | | | |
|---|---|---|---|
| 2,432,448 | 12/1947 | Richards | 526/57 |
| 3,077,371 | 2/1963 | Schoeneberg | 8/111 |
| 3,397,033 | 8/1968 | Ney | 8/111 |
| 3,600,366 | 8/1971 | Heckert | 528/488 X |
| 3,697,495 | 10/1972 | Bristol | 526/58 X |
| 3,892,719 | 7/1975 | Matsumura | 260/79.3 MU |
| 3,956,249 | 5/1976 | Goodman | 528/500 |

*Primary Examiner*—C. A. Henderson
*Attorney, Agent, or Firm*—Evelyn Berlow

[57] ABSTRACT

The discoloration of polyvinyl chloride that usually occurs when a slurry containing this polymer is heated at a temperature above 70° C. to reduce its monomer content to less than 10 ppm is minimized or prevented by carrying out the heating step in the presence of an oxidizing agent.

9 Claims, No Drawings

PROCESS FOR THE PURIFICATION OF POLYVINYL CHLORIDE WITH OXIDIZING AGENTS

This invention relates to a process for the purification of polyvinyl chloride. More particularly, it relates to a procedure for minimizing or preventing discoloration of the polymer during the removal of residual vinyl chloride from polyvinyl chloride slurries by heating at temperatures above 70° C.

When vinyl chloride is polymerized in an aqueous medium by suspension or emulsion polymerization techniques, there is obtained a slurry that contains from 5% to 50% by weight of polyvinyl chloride and up to 5% by weight of residual vinyl chloride. Most of the unreacted monomer is usually removed by heating the slurry under vacuum to about 65° C. As it is ordinarily practiced, this stripping procedure reduces the monomer content of the slurry to about 100 ppm to 20,000 ppm. Further processing yields dry products that may contain 100 ppm or more monomer.

In view of the recently-developed safety standards that require that the amount of vinyl chloride in polyvinyl chloride and in the atmosphere be maintained at very low levels, it is necessary that the monomer content of polyvinyl chloride slurries be sufficiently reduced so that these requirements can be met.

Among the most effective procedures that have been developed for the removal of residual monomer from polyvinyl chloride slurries are those that involve heating the slurries at temperatures above 70° C. until the unreacted monomer has been removed. One such process is disclosed in copending application Ser. No. 482,112, which was filed by Feldman et al. on June 24, 1974 and which is incorporated herein by reference. In the process disclosed in Serial No. 482,112, a polyvinyl chloride slurry or latex that contains from 100 ppm to 15,000 ppm by weight of vinyl chloride is heated at 70° C. to 125° C. and the evolved vinyl chloride vapor is removed until the slurry or latex contains less than 50 ppm and preferably less than 10 ppm of monomer. While this heat treatment effectively removes vinyl chloride from the slurry or latex, it often causes some deterioration of the polymer as is evidenced by its development of color. Although the slight decomposition that the polymer undergoes during heating to reduce its monomer content does not detract to any appreciable extent from its physical and mechanical properties, the discoloration seriously restricts its use in many applications.

It has now been found that the discoloration that polyvinyl chloride undergoes when slurries containing this polymer are heated at temperatures above 70° C. for a sufficient time to reduce their monomer content to the required very low levels can be minimized or eliminated by carrying out the heating step in the presence of an oxidizing agent. This treatment results in the recovery of a lighter, brighter polymer, but it does not have a noticeable effect on the other properties of the polyvinyl chloride or of the slurry that contains the polymer. The effectiveness of oxidizing agents in preventing color formation during the high temperature treatment of polyvinyl chloride slurries is surprising inasmuch as the prior art teaches that oxygen and oxygen equivalents must be excluded from polyvinyl chloride slurries that contain vinyl chloride to prevent the decomposition and discoloration of the polymer.

In the process of this invention, a slurry that contains from 5% to 50% by weight of polyvinyl chloride and from 100 ppm to 15,000 ppm of vinyl chloride is heated at a temperature between 70° C. and 100° C. in the presence of an oxidizing agent and the evolved vinyl chloride is removed until the slurry contains less than 10 ppm and preferably less than 1 ppm of vinyl chloride. The treated slurry is then further processed to yield polyvinyl chloride that contains less than 10 ppm and preferably less than 1 ppm of vinyl chloride.

The oxidizing agents that can be used in the process of this invention are those that are at least moderately soluble in water and that form colorless or nearly colorless aqueous solutions. They include oxygen, oxygen-containing gases, hydrogen peroxide, and compounds such as sodium perborate, potassium perborate, sodium persulfate, potassium persulfate, sodium carbonate peroxide, and sodium pyrophosphate peroxide that decompose in hot aqueous solutions to give oxygen or hydrogen peroxide. Oxygen, air and other oxygen-containing gases, hydrogen peroxide, and sodium perborate are the preferred oxidizing agents because they are most readily available commercially and most economical to use.

The amount of the oxidizing agent that is used is that which will prevent discoloration of polyvinyl chloride when a polyvinyl chloride slurry is heated at a temperature above 70° C. for a time sufficient to reduce its vinyl chloride content to less than 10 ppm without causing foaming or other handling problems. It is dependent upon such factors as the temperature at which the slurry is heated, the length of the heating period, and the monomer content of the slurry. In most cases, 1 part to 10 parts by weight of the oxidizing agent per 100 parts by weight of polyvinyl chloride in the slurry will prevent discoloration of the polymer during the heating treatment. Larger amounts of the oxidizing agents can be used, but they generally do not provide additional improvement in the color of the product. The oxidizing agent may be added to the polyvinyl chloride slurry before the heating of the slurry is begun, or it may be added either portionwise or continuously during the heating period. When oxygen or an oxygen-containing gas is used, it is preferably sparged through the slurry during the heating period.

As used herein, the term "polyvinyl chloride" includes both the high molecular weight homopolymers of vinyl chloride and the high molecular weight copolymers formed by the copolymerization of vinyl chloride with an essentially water-insoluble ethylenically-unsaturated monomer that is copolymerizable therewith. Suitable comonomers include vinyl acetate, vinyl propionate, vinyl butyrate, vinyl stearate, vinyl benzoate, ethylene, propylene, ethyl acrylate, acrylic acid, acrylamide, acrylonitrile, methacrylonitrile, vinylidene chloride, dialkyl fumarates and maleates, vinyl ethers, and the like. When one or more of these comonomers are used, the monomer component contains at least 70% and preferably 80% to 90% of vinyl chloride.

The polyvinyl chloride slurries that are treated in accordance with the process of this invention to prevent discoloration of the polymer during processing to remove residual vinyl chloride from them may be prepared by the well-known suspension or emulsion polymerization processes. In the suspension polymerization processes, the monomer is suspended in water by a suspending agent and agitation. The polymerization is initiated with a suitable free radical generating polymerization initiator, such as lauroyl peroxide, benzoyl peroxide, diisopropyl peroxydicarbonate, di-2-ethylhexyl peroxydicarbonate, tertiary butyl peroxypivalate, azobisisobutyronitrile, azobis-2,4-dimethylvaleronitrile, and mixtures thereof. Suspensing agents that may be used include methylcellulose, hydroxymethylcellulose, hydroxyethylcellulose, hydrolyzed polyvinyl acetate, gelatin, methyl vinyl ether-maleic anhydride copolymers, and the like. In emulsion polymerization processes, the polymerization initiator may be hydrogen peroxide, an organic peroxide, a persulfate, or a redox system. Surface-active agents, such as alkyl sulfates, alkane sulfonates, alkyl aryl sulfonates, and fatty acid soaps are used as emulsifiers in these processes. The reaction mixtures produced by these processes are usually heated under vacuum to about 60° C. to 65° C. to remove most of the unreacted monomer from them. The resulting stripped slurries generally contain 5% to 50% and preferably 15% to 40% by weight of polyvinyl chloride as particles that range in size from about 5 microns to 200 microns and from about 100 ppm to 15,000 ppm of vinyl chloride. Following the removal of vinyl chloride from them by the process of this invention, the slurries may be dewatered, for example, on a rotary drum filter, and then dried, or they may be spray dried. The polyvinyl chloride prepared in this way has excellent brightness and color and usually contains less than 1 ppm of vinyl chloride.

The invention is further illustrated by the following examples. In these examples, all parts are parts by weight and all percentages are percentages by weight.

EXAMPLE 1

A. An aqueous slurry of polyvinyl chloride was prepared by polymerizing vinyl chloride using a mixture of lauroyl peroxide and di-2-ethylhexyl peroxydicarbonate as the initiator, hydroxypropylmethylcellulose as the suspending agent, and trichloroethylene as the chain transfer agent. The slurry was heated under vacuum at a temperature below 65° C. to reduce its vinyl chloride content to less than 5,000 ppm.

B. Fifteen hundred grams of the slurry, which contained approximately 35% of polyvinyl chloride, was heated to 75° C. After the addition of 15 grams of 30% hydrogen peroxide solution to it, the slurry was heated to 95° C. Another 15 grams of 30% hydrogen peroxide solution was added, and the slurry was heated at 95° C. to 100° C. for 1 hour, cooled to 70° C., heated at 70° C. for 5 hours, and then filtered. The polyvinyl chloride, after drying at 50° C. for 12 hours, contained less than 1 ppm of vinyl chloride.

The color of the dry polyvinyl chloride was measured by reflectance using a Hunter Colorimeter, Model D-25, which gives readings directly from the polymer surface. The results obtained are given in Table I. In this table, the L value relates to the brightness of the polymer, that is, to the percentage of the light that is reflected, with perfectly white polymer having an L value of 100. The a and b values relate to hue. Positive a denotes red, negative a denotes green, positive b denotes yellow, and negative b denotes blue.

EXAMPLE 2

Five grams of sodium perborate was added to 500 grams of a polyvinyl chloride slurry that had been prepared by the procedure described in Example 1A. The treated slurry was heated at 95° C. to 100° C. for 30 minutes and then at 70° C. for 5 hours. After filtration, the polyvinyl chloride was dried at 50° C. for 12 hours. The dry polymer contained less than 1 ppm of vinyl chloride. Its color, as measured by reflectance, is given in Table I.

EXAMPLE 3

Five hundred grams of a polyvinyl chloride slurry that had been prepared by the procedure described in Example 1A was heated at 95° C. while air was sparged into it through a fritted glass dispersion tube at the rate of 840 ml./minute. The heating at 95° C. and the air sparging were continued for 2.5 hours. The slurry was then cooled and filtered, and the recovered polyvinyl chloride was dried at 50° C. for 12 hours. The dry polymer contained less than 1 ppm of vinyl chloride. Its color, as measured by reflectance, is given in Table I.

COMPARATIVE EXAMPLE A

Five hundred grams of a polyvinyl chloride slurry that had been prepared by the procedure described in Example 1A was heated at 95°–100° C. for 3 hours, cooled to room temperature, and filtered. After drying at 50° C. for 12 hours, the recovered polyvinyl chloride had a monomer content of less than 1 ppm. Its color, as measured by reflectance, is given in Table I.

COMPARATIVE EXAMPLE B

Five hundred grams of a polyvinyl chloride slurry that had been prepared by the procedure described in Example 1A was heated at 95°–100° C. for 30 minutes and then at 70° C. for 5 hours. After filtration, the product was dried at 50° C. for 12 hours. Its monomer content was less than 1 ppm. Its color, as measured by reflectance, is given in Table I.

COMPARATIVE EXAMPLE C

Five hundred grams of a polyvinyl chloride slurry that had been prepared by the procedure described in Example 1A was sparged with nitrogen for 30 minutes. The sparging with nitrogen was continued while the slurry was heated at 95°–100° C. for 30 minutes and then at 70° C. for 5 hours. After filtration, the product was dried at 50° C. for 12 hours. Its monomer content was less than 1 ppm. Its color, as measured by reflectance, is given in Table I.

Table I

| | Treatment of Slurry | Reflectance of PVC | | |
|---|---|---|---|---|
| | | L | a | b |
| Ex. No. | | | | |
| 1 | 0.85 PHR of $H_2O_2$ added; slurry heated to 95° C.; 0.85 PHR of $H_2O_2$ added; slurry heated at 95°–100° C. For 1 hour and at 70° C. for 5 hours. | 97.8 | 0.2 | 2.3 |
| 2 | 2.8 PHR of sodium perborate added; slurry heated at 95°–100° C. for 0.5 hour and at 70° C. for 5 hours. | 97.7 | 0.8 | 1.6 |
| 3 | Slurry heated and air-sparged at 95° C. for 2.5 hours | 97.8 | 0.8 | 1.9 |
| Comp. Ex. No. | | | | |
| A | Slurry heated at 95°–100° C. for 3 hours. | 95.0 | 1.9 | 6.2 |
| B | Slurry heated at 95°–100° C. for 0.5 hour and at 70° C. for 5 hours. | 97.3 | 1.1 | 1.8 |
| C | Slurry sparged with $N_2$ for 0.5 hour, and then heated | 96.7 | 1.3 | 2.8 |

Table I-continued

| Treatment of Slurry | Reflectance of PVC | | |
|---|---|---|---|
|  | L | a | b |
| and N$_2$-sparged at 95°–100° C. for 0.5 hour and at 70° C. for 5 hours. | | | |

The data in Table I show that the addition of an oxidizing agent to a polyvinyl chloride slurry that is maintained at elevated temperatures until its monomer content has fallen below 1 ppm results in the recovery of lighter-colored and brighter polyvinyl chloride than is obtained in the absence of an oxidizing agent. The products prepared using either hydrogen peroxide (Example 1) or sodium perborate (Example 2) were appreciably brighter than those prepared in the absence of an oxidizing agent (Comparative Example A and B). The product of Example 3, which was prepared by sparging the heated slurry with air, was brighter and less red than that of Comparative Example B, where no attempt was made to add or remove oxygen during the heat treatment of the slurry, while the product of Comparative Example C, from which oxygen was removed by sparging with nitrogen, was considerably duller than the products of both Example 3 and Comparative Example B.

EXAMPLE 4

Three 500 gram portions of a polyvinyl chloride slurry prepared by the procedure described in Example 1A were heated to 95° C. Small amounts of 30% hydrogen peroxide solution were added to two of the heated portions of slurry; the third portion served as the control. The three portions of slurry were heated at 95°–100° C. for 1 hour, cooled to 70° C., heated at 70° C. for 5 hours, and then filtered. The polyvinyl chloride, which was dried at 50° C. for 12 hours, contained less than 1 ppm of vinyl chloride. The amounts of hydrogen peroxide that were added to two of the portions of slurry, and the colors of the products are given in Table II.

Table II

| Ex. No. | Amount (PHR) of H$_2$O$_2$ Added | Reflectance of PVC | | |
|---|---|---|---|---|
|  |  | L | a | b |
| 4a | 3.4 | 98.1 | 0.3 | 1.9 |
| 4b | 1.7 | 97.7 | 0.8 | 2.4 |
| 4c | 0 | 96.4 | 1.5 | 2.7 |

From the data in Table II, it will be seen that the products recovered from the portions of slurry that had been treated with hydrogen peroxide before heating were brighter and had better color than the control. Increasing the amount of hydrogen peroxide added gave brighter polymer with less yellow and less red hue.

What is claimed is:

1. In the process for the removal of vinyl chloride from an aqueous slurry that contains 5% to 50% by weight of polyvinyl chloride and 100 ppm to 15,000 ppm of vinyl chloride wherein the slurry is heated at a temperature between 70° C. and 100° C. until it contains less than 10 ppm of vinyl chloride, the improvement wherein discoloration of the polyvinyl chloride is inhibited by contacting the polyvinyl chloride in the slurry with a water-soluble oxidizing agent during the heat treatment.

2. The process of claim 1 wherein the oxidizing agent is selected from the group consisting of oxygen, oxygen-containing gases, hydrogen peroxide, and compounds that decompose in hot aqueous solutions to give oxygen or hydrogen peroxide.

3. The process of claim 1 wherein the oxidizing agent is oxygen.

4. The process of claim 1 wherein the oxidizing agent is hydrogen peroxide.

5. The process of claim 1 wherein the oxidizing agent is sodium perborate.

6. The process of claim 1 wherein the amount of oxidizing agent added is that which will inhibit discoloration of the polyvinyl chloride.

7. The process of claim 1 wherein 1 part to 10 parts by weight of oxidizing agent is added per 100 parts by weight of polyvinyl chloride in the slurry.

8. The process of claim 1 wherein the oxidizing agent is added before the slurry is heated at 70° C. to 100° C.

9. The process of claim 1 wherein the oxidizing agent is added continuously during the heating of the slurry at 70° C. to 100° C.

* * * * *